(12) United States Patent
Yamamoto

(10) Patent No.: US 6,593,447 B1
(45) Date of Patent: Jul. 15, 2003

(54) CATALYST FOR POLYESTER PRODUCTION AND PROCESS FOR PRODUCING POLYESTER WITH THE SAME

(75) Inventor: Tomoyoshi Yamamoto, Matsuyama (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/763,926
(22) PCT Filed: Jun. 23, 2000
(86) PCT No.: PCT/JP00/04159
§ 371 (c)(1), (2), (4) Date: Feb. 23, 2001
(87) PCT Pub. No.: WO01/00706
PCT Pub. Date: Jan. 4, 2001

(30) Foreign Application Priority Data

| Jun. 24, 1999 | (JP) | 11-178112 |
| Nov. 25, 1999 | (JP) | 11-333768 |
| Feb. 4, 2000 | (JP) | 2000-027687 |

(51) Int. Cl.[7] .................. C08G 63/78; B01J 27/14
(52) U.S. Cl. ............ 528/279; 528/286; 528/298; 528/302; 528/308; 528/308.6; 524/706; 524/709; 524/711; 524/783; 502/208; 502/227
(58) Field of Search ............. 528/279, 286, 528/298, 302, 308, 308.6; 524/706, 709, 711, 783; 502/208, 227

(56) References Cited

U.S. PATENT DOCUMENTS

| 5,104,842 A | 4/1992 | Garapon et al. |
| 5,453,479 A | 9/1995 | Borman et al. ............. 528/279 |

FOREIGN PATENT DOCUMENTS

| JP | 4-189821 | 7/1992 | ........ C09G/63/688 |
| WO | WO 99/54039 A1 | 10/1999 | |

OTHER PUBLICATIONS

International Search Report.
International Search Report.
Patent Abstracts of Japan, JP 54–043295, dated Apr. 5, 1979.
Patent Abstracts of Japan, JP 55–056121, dated Apr. 24, 1980.

Primary Examiner—Samuel A. Acquah
(74) Attorney, Agent, or Firm—Sughrue Mion, PLLC

(57) ABSTRACT

A polyester having a good color tone, an excellent forming property and a high resistance to cohesion of foreign substance around a melt-spinning orifice when the polyester is melt-spun, is produced by polymerizing an aromatic difunctional carboxylic acid—alkyleneglycol ester and/or oligomer thereof in the presence of a catalyst including a reaction product of (A) a Ti compound component including a Ti compound (1) of formula (I) or a Ti compound (2) produced by reacting the Ti compound (1) with an aromatic difunctional carboxylic acid of the formula (III) or anhydride thereof, with (B) a P compound component selected from P compound (3) of the formula (III).

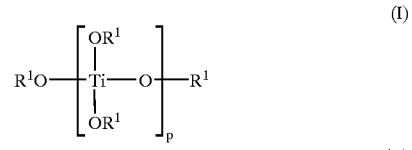

(I)

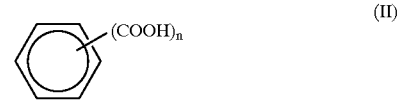

(II)

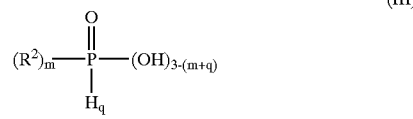

(III)

[$R^1 = C_2$–$C_{10}$ alkyl group; p=1–3, n=2–4, $R^2$=substituted or unsubstituted $C_6$–$C_{20}$ aryl or $C_1$–$C_{20}$ alkyl group, m=1 or 2, q=0 or 1, and m+q=1 or 2].

13 Claims, No Drawings

CATALYST FOR POLYESTER PRODUCTION AND PROCESS FOR PRODUCING POLYESTER WITH THE SAME

TECHNICAL FIELD

The present invention relates to a catalyst for producing a polyester and a process for producing the polyester by using the same. More particularly, the present invention relates to a catalyst for producing a polyester, comprising a specific titanium compound and a phosphorus compound, and a process for producing the polyester having a good color tone (b value), and thus not needing an addition of a cobalt compound to regulate the color tone, by using the catalyst.

BACKGROUND ART

The polyesters, particularly, polyethylene terephthalate, polyethylene naphthalate, polytrimethylene terephthalate and polytetramethylene terephthalate, have excellent mechanical, physical and chemical performances and thus are widely utilized for various fibers, films and other shaped articles.

For example, polyethylene terephthalate is usually produced by preparing an ethyleneglycol ester of terephthalic acid and/or oligomers of the ester by a direct esterification reaction of terephthalic acid with ethyleneglycol, or an interesterification reaction of a lower dialkyl ester of terephthalic acid, for example, dimethyl terephthalate, with ethyleneglycol, or a reaction of terephthalic acid with ethyleneoxide, and then by polymerizing ethyleneglycol ester of terephthalic acid and/or oligomer of the ester in the presence of a polymerization catalyst under a reduced pressure at an elevated temperature, until the polymerization product obtains a target degree of polymerization. Also, the polyethylene naphthalate, polytrimethylene terephthalate and polytetramethylene terephthalate can be produced by a process similar to that mentioned above.

It is well known that the reaction rate of the polymerization reaction and the quality of the resultant polyester are greatly influenced by the type of the catalyst for the polymerization reaction step. As a polymerization catalyst for the polyethylene terephthalate, antimony compounds are most widely employed, because they exhibit excellent catalytic property for polymerization, and the resultant polyester has a good color tone.

However, when the animony compounds are employed as a polymerization catalyst, the resultant polyester is disadvantageous in that when a melt-spinning procedure of the resultant polyester is continuously carried out for a long period, a foreign substance is cohered and accumulated around the melt-spinning orifice (which foreign substance will be referred to as an orifice foreign substance hereinafter), and causes the stream of the polymer melt extruded through the orifice to be bent (which will be referred to as a bending phenomenon of polymer melt stream hereinafter), and the bending phenomenon causes formation of fluffs and breakage of melt spun filaments to occur during the melt-spinning and drawing procedures. Namely, the shaping property of the polyester is degraded by the antimony compound catalyst.

As a polymerization catalyst other than the antimony compounds, the utilization of titanium compounds, for example, titanium tetrabutoxide is suggested. When the titanium compound as mentioned above is employed, the problem of accumulation of the orifice foreign substance can be solved. However, this catalyst causes a new disadvantage in that the resultant polyester per se is colored yellowish and exhibits a poor stability to heat-melting.

To solve the above-mentioned coloring problem, generally, a cobalt compound is mixed into the polyester to erase the yellowish color. It is true that the color tone (apparent whiteness) of the polyester can be improved by mixing the cobalt compound into the polyester. However, the mixed cobalt compound causes the stability of the polyester to heat melting to be decreased and thus the resultant polyester to be easily decomposed.

As a titanium compound for catalyst for the production of the polyester, it is known to employ titanium hydroxide in Japanese Examined Patent Publication No. 48-2,229, α-titanic acid in Japanese Examined Patent Publication No. 47-26,597.

However, in the former catalyst the titanium hydroxide is difficult to pulverize and in the latter catalyst, α-titanic acid is easily modified and is difficult to store and handle. Thus, both the catalysts are not suitable for practical industrial use, and also the catalysts are seldom produce a polyester having a good color tone (b value).

Also, Japanese Examined Patent Publication No. 59-46,258 discloses that a product obtained by a reaction of a titanium compound with trimellitic acid is used as a catalyst for producing the polyester, and Japanese Unexamined Patent Publication No. 58-38,722 discloses that a product of titanium compound with a phosphite ester is usable as a catalyst for producing the polyester. It is true that both the processes enable the stability of the polyester for melting heat to be enhanced to some extent. However, the color tone (colorlessness) of the resultant polyester is unsatisfactory. Thus, the color tone (b value) of the polyester must be further improved.

Further, Japanese Unexamined Patent Publication No. 7-138,354 discloses employment of a complex of a titanium compound with a phosphorus compound as a catalyst for producing the polyester. This process enables the stability of the resultant polyester to melting heat to some extent. However, the color tone of the resultant polyester is unsatisfactory.

Furthermore, when the phosphorus-containing catalyst as mentioned above is employed, the catalyst per se is usually retained, as a foreign substance, in the resultant polyester polymer. Thus, this problem must be solved.

DISCLOSURE OF THE INVENTION

An object of the present invention to provide a catalyst for producing a polyester having a good color tone (b value), a low content of a foreign substance and an excellent melting heat stability, and a process for producing a polyester by using the same.

The above-mentioned object can be attained by the catalyst of the present invention for producing a polyester and the process of the present invention for producing a polyester by using the catalyst. The catalyst of the present invention for producing the polyester comprises a reaction product of (A) a titanium compound component comprising at least one member selected from the group consisting of:
  titanium compounds (1) represented by the general formula (I):

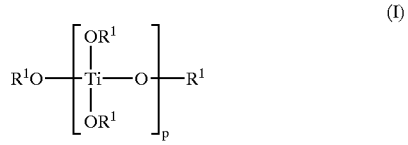

in which formula (I), $R^1$ represents an alkyl group having 1 to 10 carbon atoms and p represents an integer of 1 to 3, and titanium compounds (2) produced by reacting the titanium compounds (1) of the formula (I) with aromatic polycarboxylic acids represented by the general formula (II):

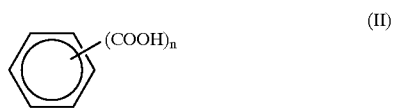

in which formula (II), n represents an integer of 2 to 4, or anhydrides of the aromatic polycarboxylic acids of the formula (II), with (B) a phosphorus compound component comprising at least one member selected from the phosphorus compounds (3) of the general formula (III):

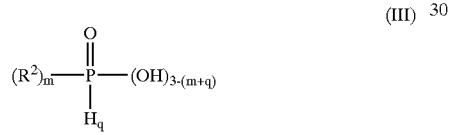

in which formula (III), m represents an integer of 1 or 2, q represents an integer of 0 or 1, the sum of m and q, (m+q), is 1 or 2, $R^2$ represents an unsubstituted or substituted aryl group having 6 to 20 carbon atoms or alkyl group having 1 to 20 carbon atoms and when m represents 2, the two $R^2$ groups are the same as each other or different from each other.

The process of the present invention for producing a polyester comprises polymerizing a polymerization-starting material comprising at least one member selected from the group consisting of alkyleneglycol esters of aromatic difunctional carboxylic acids and oligomers thereof in the presence of a catalyst, wherein the catalyst comprises a reaction product of (A) a titanium compound component comprising at least one member selected from the group consisting of:
titanium compounds (1) represented by the general formula (I):

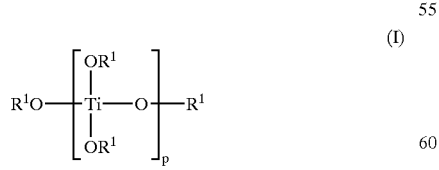

in which formula (I), $R^1$ represents an alkyl group having 1 to 10 carbon atoms and p represents an integer of 1 to 3, and titanium compounds (2) produced by reacting the titanium compounds (1) of the formula (I) with aromatic polycarboxylic acids represented by the general formula (II):

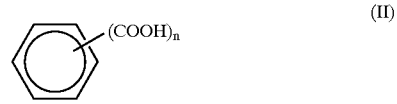

in which formula (II), n represents an integer of 2 to 4, or anhydrides of the aromatic polycarboxylic acids of the formula (II), with (B) a phosphorus compound component comprising at least one member selected from the phosphorus compounds (3) of the general formula (III):

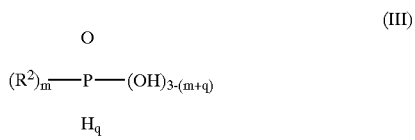

in which formula (III), m represents an integer of 1 or 2, q represents an integer of 0 or 1, the sum of m and q, (m+q), is 1 or 2, $R^2$ represents an unsubstituted or substituted aryl group having 6 to 20 carbon atoms or alkyl group having 1 to 20 carbon atoms and when m represent 2, the two $R^2$ groups are the same as each other or different from each other; and the amount of the catalyst in terms of molar amount in millimole of titanium atoms contained in the catalyst corresponds to 10 to 40% of the amount in millimole of the aromatic difunctional carboxlic acids contained in the polymerization-starting material.

BEST MODE OF CARRYING OUT THE INVENTION

The catalyst of the present invention for producing a polyester comprises a reaction product of a titanium compound component (A) with a phosphorus compound component (B) which will be explained in detail hereinafter.

The titanium compound component (A) usable for the catalyst of the present invention comprises at least one member selected from the group consisting of titanium compounds (1) represented by the following general formula (I):

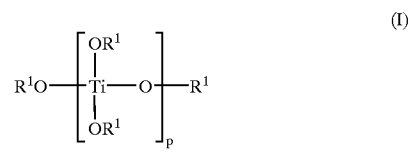

in which formula (I), $R^1$ represents an alkyl group having 2 to 10 carbon atoms, preferably 3 to 6 carbon atoms, p represents an integer of 1 to 3, preferably 1 to 2; and titanium compounds (2) obtained by reacting the titanium compounds (1) of the general formula (I) with aromatic polycarboxylic acids represented by the following general formula (II):

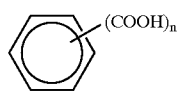

(II)

in which formula (II), n represents an integer of 2 to 4, preferably 2 to 3, or anhydrides of the aromatic polycarboxylic acid.

The phosphorus compound component (B) usable for the catalyst of the present invention comprises at least one member selected from the phosphorus compounds (3) represented by the following general formula (III):

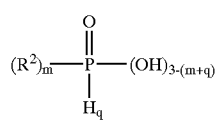

(III)

in which formula (III), m represents an integer of 1 or 2, q represents an integer of 0 or 1, the sum of m and q is 1 or 2, $R^2$ represents an unsubstituted or substituted aryl group having 6 to 20 carbon atoms, preferably 6 to 10 carbon atoms, or alkyl group having 1 to 20 carbon atoms, preferably 2 to 12 carbon atoms, and when m represents an integer of 2, the two $R^2$ groups may be the same as each other or different from each other.

In the reaction product of the titanium compound component (A) with the phosphorus compound component (B), usable as a catalyst of the present invention for producing the polyester, preferably, in the reaction product of the titanium compound component (A) with the phosphorus compound component (B), the ratio $m_{Ti}/m_p$ of the amount of the titanium compound component (A) in terms of a molar amount $m_{Ti}$ of titanium atoms to the amount of the phosphorus compound component (B) in terms of a molar amount $m_p$ of phosphorus atoms is in the range of from 1:1 to 1:4, more preferably 1:1.5 to 1:2.5.

The phrase "an amount ($m_{Ti}$) of the titanium compound component (A) in terms of a molar amount of titanium atoms" refers to as a total sum of products of molar amounts of individual titanium compounds and the numbers of the titanium atoms per molecule contained in individual titanium compounds.

Also, the phrase "an amount ($m_p$) of the phosphorus compound component (B) in terms of a molar amount of phosphorus atoms" refers to a total sum of products of molar amounts of individual phosphorus compounds and the numbers of the phosphorus atoms per molecule contained in the individual phosphorus compounds. The phosphorus compounds of the formula (III) contain only one phosphorus atoms per molecule of the individual phosphorus compounds. Thus, in this case, the amount of each phosphorus compound in terms of a molar amount of phosphorus atoms is the same as the real molar amount of each phosphorus compound.

When the reaction molar ratio $m_{Ti}/m_p$ is more than 1:1, namely when the amount of the titanium compound component (A) is too much, the resultant catalyst may cause the polyester produced by using the catalyst to exhibit an unsatisfactory color tone (apparent whiteness) and an insufficient heat resistance. Also, when the reaction molar ratio $m_{Ti}/m_p$ is less than 1:4, namely when the amount of the titanium compound component (A) is too small, the resultant catalyst may exhibit an insufficient catalytic activity for the production of the polyester.

The titanium compounds (1) of the general formula (I) usable for the titanium compound component (A) include, titanium tetraalkoxides, for example, titanium tetrabutoxide, titanium tetraisopropoxide, titanium tetrapropoxide, and titanium tetraethoxide; and alkyl titnates, for example, octaalkyl trititanates and hexaalkyl dititanates. Among them, the titanium tetraalkoxides which have a high reactivity to the phosphorus compounds usable for the present invention are preferably employed. Particularly, titanium tetrabutoxide is more preferably employed for the present invention.

The titanium compounds (2) usable for the titanium compound component (A) is produced by reacting the titanium compounds (1) of the general formula (I) with aromatic polycarboxilic acids of the general formula (III) or anhydrides thereof. The aromatic polycarboxylic acids of the general formula (II) and the anhydrides thereof are preferably selected from phthalic acid, trimellitic acid, hemimellitic acid and pyromellitic acid and anhydrides of the above-mentioned acids. Particularly, trimellitic anhydride, which has a high reactivity to the titanium compounds (1) and enables the resultant polymerization product to exhibit a high affinity with the resultant polyester, is preferably employed.

The reaction of the titanium compounds (1) with the aromatic polycarboxylic acids or the anhydrides thereof can be carried out by mixing the aromatic polycarboxylic acids or anhydrides thereof into a solvent to cause a portion or all of the polycarboxylic acids or the anhydrides thereof to be solved in the solvent; adding dropwise the titanium compound (1) into the mixture; and heating the reaction mixture at a temperature of 0 to 200° C. for 30 minutes or more, preferably at 30 to 150° C. for 40 to 90 minutes.

In the reaction, there is no specific restriction to the reaction pressure, and the reaction can be sufficiently effected under the ambient atmospheric pressure. The solvent for the above-mentioned reaction may be selected from those capable of dissolving therein a portion or all amount of the compounds of the formula (II) or the anhydrides thereof. The solvent is preferably selected from ethyl alcohol, ethyleneglycol, trimethyleneglycol, tetramethylenglycol, benzene and xylene.

There is no specific limitation to the reaction molar ratio of the titanium compounds (1) with the compounds of the formula (II) or anhydrides thereof. However, if the proportion of the titanium compound (1) is too high, the resultant polyester may exhibit an unsatisfactory color tone and too low a softening temperature. If the proportion of the titanium compound (1) is too low, the resultant catalyst may exhibit an insufficient catalytic activity for promoting the polymerization reaction.

Accordingly, the reaction molar ratio of the titanium compounds (1) to the compounds of the formula (II) or the anhydrides thereof is preferably 2/1 to 2/5. The reaction product of the above-mentioned reaction may be subjected to the reaction procedure with the above-mentioned phosphorus compound (3) without refining or after refining the reaction product by a recrystallization thereof with a recrystallizing agent, for example, acetone, methyl alcohol and/or ethyl acetate.

In the phosphorus compound (3) represented by the general formula (III) usable for the phosphorus compound component (B), the $C_6$–$C_{20}$ aryl groups or $C_1$–$C_{20}$ alkyl groups represented by $R^2$ may have no substituent or one or more substituents. The substituents include, for example, a carboxyl group, alkyl groups, a hydroxyl group and an amino group.

The phosphorus compounds (3) of the general formula (III) are selected from the groups consisting of, for example, phenylphosphonic acid, methylphosphonic acid, ethylphosphonic acid, propylphosphonic acid, isopropylphosphonic acid, butylphosphonic acid, tolylphosphonic acid, xylylphosphonic acid, biphenylphosphonic acid, naphthylphosphonic acid, anthorylphophonic acid, 2-carboxylphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicaiboxyphenylphosphonic acid, 3,5-dicarboxyphenylphosphonic acid, 2,3,4-tricarboxyphenylphosphonic acid, 2,3,5-tricarboxyphenylphosphonic acid, 2,3,6-tricarboxyphenylphosphonic acid, 2,4,5-tricarboxyphenylphosphonic acid, 2,4,6-tricarboxyphenylphosphonic acid, phenylphosphinic acid, methylphosphinic acid, ethylphosphinic acid, propylphosphinic acid, isopropylphosphinic acid, butylphosphinic acid, tolylphosphinic acid, xylylphosphinic acid, biphenylphosphinic acid, diphenylphosphinic acid, dimethylphosphinic acid, diethylphosphinic acid, dipropylphosphinic acid, diisopropylphosphinic acid, dibuatylphosphinic acid, ditolylphosphinic acid, dixylylphosphinic acid, dibiphenylphosphinic acid, naphthylphosphinic acid, anthrilphosphinic acid, 2-carboxyphenylphosphinic acid, 3-carboxyphenylphosphinic acid, 4-carboxyphenylphosphinic acid, 2,3-dicarboxyphenylphosphinic acid, 2,4-dicarboxyphenylphosphinic acid, 2,5-dicarboxyphenylphosphinic acid, 2,6-dicarboxyphenylphosphinic acid, 3,4-dicarboxyphenylphosphinic acid, 3,5-dicarboxyphenylphosphinic acid, 2,3,4-tricarboxyphenylphosphinic acid, 2,3,5-tricarboxyphenylphosphinic acid, 2,3,6-tricarboxyphenylphosphinic acid, 2,4,5-tricarboxyphenylphosphinic acid, 2,4,6-tricarboxyphenylphosphinic acid, bis(2-carboxyphenyl)phosphinic acid, bis(3-carboxyphenyl)phosphinic acid, bis(4-carboxyphenyl)phosphinic acid, bis(2,3-dicarboxyphenyl)phosphinic acid, bis(2,4-dicarboxyphenyl)phosphinic acid, bi(2,5-dicarboxyphenyl)phosphinic acid, bis(2,6-dicarboxyphenyl)phosphinic acid, bis(3,4-dicarboxyphenyl)phosphinic acid, bis(3,5-dicarboxyphenyl)phosphinic acid, bis(2,3,4-tricarboxyphenyl)phosphinic acid, bis(2,3,5-tricarboxyphenyl)phosphinic acid, bis(2,3,6-tricarboxyphenyl)phosphinic acid, bis(2,4,5-tricarboxyphenyl)phosphinic acid, and bis(2,4,6-tricarboxyphenyl)phosphinic acid.

The preparation of the catalyst from the titanium compound component (A) and the phosphorus compound component (B) is carried out, for example, by mixing the component (B) comprising at least one phosphorus compound (3) of the formula (III) into a solvent to dissolve a portion or all amount of the phosphorus compound component (B) in the solvent; adding dropwise the titanium compound component (A) into the component (B) mixture; and heating the resultant reaction system at a temperature of 0 to 200° C. for a reaction time of 30 minutes or more, preferably 60 to 150° C. for a reaction time of 40 to 90 minutes. In this reaction, there is no specific limitation to the reaction pressure. The reaction may be carried out under pressure (0.1 to 0.5 MPa), or the ambient atmospheric pressure, or a reduced pressure (0.001 to 0.1 Pa), but is usually carried out under the ambient atmospheric pressure.

The solvent usable for the component (A) comprising the phosphorus compound (3) of the formula (III) for the catalyst preparation is not limited to specific solvents as long as the solvent can dissolve therein at least a portion of the phosphorus compound component (B). Preferably, the solvent comprises at least one member selected from, for example, ethyl alcohol, ethyleneglycol, trimethyleneglycol, tetramethyleneglycol, benzene and xylene. Particularly, the solvent comprises a glycol compound the same as the glycol component from which the target polyester is prepared.

In the catalyst-preparation reaction as mentioned above, the mixing ratio of the titanium compound component (A) and the phosphorus compound component (B) in the reaction system is established so that in the reaction product produced from the titanium compound component (A) and the phosphorus compound component (B) and contained in the resultant catalyst, the ratio $m_{Ti}/m_p$ of the amount of the titanium compound component (A) in terms of a molar amount $m_{Ti}$ of titanium atoms contained in the component (A) to the amount of the phosphorus compound component (B) in terms of a molar amount $m_p$ of the phosphorus atoms contained in the component (B) is in the range of from 1:1 to 1:4. A preferable reaction molar ratio $m_{Ti}/m_p$ is in the range of 1:1 to 1:3.

The reaction product of the titanium compound component (A) with the phosphorus compound component (B) is isolated from the reaction system thereof by way of, for example, a centrifugal sedimentation treatment or, filtration and the isolated reaction product may be employed, without refining it, as a catalyst for the production of the polyester, or the isolated reaction product may be refined by, for example, recrystallizing the reaction product from a recrystallizing agent, for example, acetone, methyl alcohol and/or water, and the refined product may be employed as a catalyst.

In the process for producing the polyester of present invention, a polymerization-starting material comprising at least one member selected from alkyleneglycol esters of aromatic difunctional carboxylic acids and polymers having a low degree of polymerization (oligomers) thereof, is polymerized in the presence of the above-mentioned catalyst.

In the process of the present invention for producing the polyester, the amount of the catalyst in terms of molar amount in millimoles of titanium atoms contained therein is established at 10 to 40% based on the total molar amount in millimoles of the aromatic difunctional carboxylic acids contained in the polymerization-starting material. The catalyst amount is preferably 10 to 25% on the same basis as mentioned above. If the catalyst is employed in an amount of less than 10%, the effect of the catalyst for promoting the polymerization reaction of the polymerization-starting material is insufficient, thus the production efficiency for the polyester is insufficient and thus a polyester having a target degree of polymerization is not obtained. Also, if the catalyst is employed in an amount of more than 40%, the resultant polyester has an unsatisfactory color tone, (b value) and is slightly colored yellowish and thus exhibits an unsatisfactory utilizability in practice.

In the alkyleneglycol esters of the aromatic difunctional carboxylic acids usable as a polymerization-starting material for the process of the present invention for producing the polyester, the aromatic difunctional carboxylic acids are preferably selected form terephthalic acid, isophtalic acid, naphthalenedicarboxylic acid, biphenyldicarboxylic acid, diphenylsulfonedicarboxylic acid, diphenyletherdicarboxylic acid, diphenyletherdicarboxylic acid, diphenoxyethanedicarboxylic acid, and β-hydroethoxybenzoic acid, more preferably terephthalic acid and naphthalenedicarboxylic acid. Also, the alkyleneglycols are preferably selected from ethyleneglycol, trimethyleneglycol, tetramethyleneglycol, neopentylglycol and hexamethyleneglycol.

The alkeleneglycol esters of the aromatic difunctional carboxylic acids and/or oligomers may be produced by any process. Usually, the they are produced by heat-reacting an aromatic difunctional carboxylic acid or an ester-producing derivative thereof with an alkyleneglycol or an ester-producing derivative thereof.

For example, ethyleneglycol ester of terephthalic acid and oligomers thereof which are used as a starting material for polyethylene terephthalate will be explained below. They are usually produced by directly esterifying terephthalic acid with ethyleneglycol, or by interesterifying a lower alkyl ester of terephthalic acid with ethyleneglycol or by addition-reacting terephthalic acid with ethylene oxide.

Also, trimethyleneglycol ester of terephthalic acid and/or oligomers thereof which are used as a starting material for polytrimethylene terephthalate will be explained below. They are usually produced by directly esterifying terephthalic acid with trimethyleneglycol, or by interesterifying a lower alkylester of terephthalic acid with trimethyleneglycol, or by addition reacting terephthalic acid with trimethyleneoxide.

The above-mentioned alkyleneglycol esters of aromatic difunctional carboxylic acids and/or oligomers thereof, may be employed together with other difunctional carboxylic esters copolymerizable with the above-mentioned esters or oligomers, as an additional component, in an amount of 10 molar % or less, preferably 5 molar % or less, based on the total molar amount of the acid component, as long as the additional component does not cause the effect of the process of the present invention to be substantially degraded.

The preferably copolymerizable additional component may be selected from esters of an acid component comprising at least one member selected from, for example, aliphalic and cycloaliphatic difunctional dicarboxylic acids, for example, adipic acid, sebacic acid and 1,4-cyclohexanedicarboxylic acid, and hydroxycarboxylic acids, for example, -β-hydroxyethoxybenzoic acid and p-hydroxybenzoic acid with a glycol component comprising at least one member selected from aliphatic cycloaliphatic and aromatic diol compounds, for example, alkyleneglycols having 2 or more carbon atoms, 1,4-cyclohexanedimethanol, neopentylglycol, bisphenol A and bisphenol S, and polyoxyalkyleneglycols, or anhydrides of the esters. The additional components may be employed alone or in a mixture of two or more thereof. The content of the additional components in the copolymers must be in the above-mentioned range.

In the process of the present invention for producing the polyester, a procedure in which the catalyst is added into the polymerization-starting material may be effected in any stage before the start of the polymerization reaction of an aromatic difunctional carboxylic acid-alkyleneglycol ester or an oligomer thereof, and the catalyst-adding procedure may be carried out by any conventional method. For example, after a preparation of an aromatic difunctional carboxylic ester is completed, a solution or slurry of a catalyst may be added into the preparation system, to start a polymerization reaction, or the catalyst may be added into the reaction system, before the preparation of the aromatic difunctional carboxylic ester, together with the starting material or after the starting material is fed into the reaction system.

In the process of the present invention, there is no specific limitation to the conditions for the production of the polyester. Preferably, the polymerization reaction is carried out at a temperature of 230 to 320° C. or under the ambient atmospheric pressure or a reduced pressure, for example, 0.1 Pa to 0.1 Mpa, or under the combined conditions of the above-mentioned temperature with the above-mentioned pressure, for 15 to 300 minutes.

In the process of the present invention, the reaction system is optionally added with a stabilizing agent, for example, trimethyl phosphate and further with another additive, for example, antioxidant, ultra-violet ray-absorbing agent, flame-retardant, fluorescent brightening agent, delustering agent, color tone-regulating agent and anti-foaming agent at any stage in the polyester production procedure.

Further, to finely regulate the color of the polyester, during the polyester production procedure, a color tone-regulating agent comprising at least one member selected from organic blue-coloring pigments, for example, ago, triphenylenethane, guinoline, anthraquinone and phthalocyanine blue-coloring pigments, and inorganic blue-coloring pigments may be mixed into the reaction system. Also, in the process of the present invention for producing the polyester, a conventional cobalt-containing inorganic blue-coloring pigment, which causes the melting heat stability of polyester to be decreased, is not necessary as a color tone regulating agent to the polyester, and thus the resultant polyester of the present invention is preferably substantially free from cobalt.

The polyester obtained by the process of the present invention usually exhibits an L value of 80.0 or more and a b value of −2.0 to 5.0, determined by a HUNTER color difference meter. If the L value is less than 80.0, the resultant polyester may exhibit too low a whiteness and thus may not form a shaped polyester article having a high whiteness and useful in practical use. Also, if the b value is less than −2.0, the resultant polyester may have too high a blueing effect whereas the yellowing effect of the polyester may be low. Further, if the b value is more than 5.0, the resultant polyester may exhibit too high a yellowing effect and thus may not be subjected to the production of a practically useful shaped polyester article.

In the polyester produced by the process of the present invention, the L value is preferably 82 or more, more preferably 83 or more, and the b value is preferably −1.0 to 4.5, more preferably 0.0 to 4.0.

The L value and b value of the polyester obtained by the process of the present invention is determined by the following method.

Namely, a sample of the polyester is melted at a temperature of 290° C. under vacuum for 10 minutes, the polyester melt is formed into a plate having a thickness of 3.0±1.0 mm on an aluminum plate and, immediately after the forming, the polyester plate is cooled in ice water, the cooled plate is dried at 160° C. for one hour, the dried plate is subjected to a crystallization treatment, the resultant plate is placed on a plate having a standard whiteness and for providing a color difference meter ready for use and the color tone of the surface of the plate was measured by a HUNTER color difference meter (model: CR-200, made by MINOLTA CO.).

The polyester produced by the process of the present invention contains substantially no cobalt atoms derived from a color tone-regulating cobalt compound. The cobalt atom-containing polyester is disadvantageous in that polyester exhibits a low melting heat stability and is easily decomposed. The phrase "a polyester containing substantially no cobalt atoms" refers to a polyester produced without employing a cobalt compound as a color tone-regulating agent or a polymerization catalyst and thus containing no cobalt atoms derived from the above-mentioned cobalt compound. Therefore, the polyester of the present invention may contain cobalt atoms derived from a cobalt compound added to the polyester for a purpose other than the purposes of the color tone-regulating agent and the catalyst.

The polyester of the present invention preferably has a content of solid foreign particles having an average particle size of 3 μm or more limited to 500 particles/g or less. When the foreign particle content is limited to 500 particles/g or less, blockage of a filter for the melt-shaping procedure and an increase in back pressure in the melt-spinning procedure are significantly restricted. The content of the foreign particles is more preferably 450 particles/g or less, still more preferably 400 particles/g or less.

In the polyester of the present invention, when heated in a nitrogen gas atmosphere at a temperature of 290° C. for 15 minutes, preferably the number of breakage of backbone chains of the polyester molecules is limited to 4.0 equivalents/1,000 kg or less. When the breakage number of the backbone chains of the polyester molecules is 4.0 equivalents/1,000 kg or less, the deterioration of the polyester during the melt-shaping procedures is significantly restricted and thus the mechanical properties and the color tone of the shaped article can be improved. The above-mentioned breakage number of the backbone chains of the polyester molecules is more preferably 3.8 equivalents/1,000 kg or less, still more preferably 3.5 equivalents/1,000 kg or less.

In the polyester of the present invention, there is no specific limitation to the intrinsic viscosity thereof. Usually, the intrinsic viscosity of the polyester is preferably in the range of from 0.55 to 1.0. When the intrinsic viscosity is in the above-mentioned range, the melt-processing can be easily carried out and the resultant shaped article exhibits a high mechanical strength. The above-mentioned intrinsic viscosity of the polyester is more preferably in the range of from 0.60 to 0.90, still more preferably from 0.62 to 0.80.

The intrinsic viscosity of the polyester is determined in a solution in orthochlorophenol at a temperature of 35° C.

EXAMPLES

The present invention will be further illustrated by the following examples which are not intended to restrict the scope of the present invention. In the examples, the intrinsic viscosity, the color tone, the titanium content of catalyst, the number of foreign particles, a layer of foreign matter adhered around a melt-spinning orifice and the melting heat stability, as mentioned above were determined by the following measurements.

(1) Intrinsic viscosity

The intrinsic viscosity of a polyester polymer was determined from viscosities of solutions of the polyester polymer in orthochlorophenol measured at a temperature of 35° C.

(2) Color tone (L value and b value).

A sample of a polymer was melted at a temperature of 290° C. under vacuum for 10 minutes, the melted polymer was formed into a plate having a thickness of 3.0±1.0 mm on an aluminum plate and, immediately after the forming, the polymer plate was rapidly cooled in ice water, the cooled plate was subjected to a crystallization treatment at 160° C. for one hour, the crystallized polymer plate was placed on a plate having a standard whiteness and for making a color difference meter (HUNTER type color difference meter, model: CR-200, made by MINOLTA CO.) ready for use, and the Hunter L value and b value of the polymer plate surface was measured by using the color difference meter. The L value represents a brilliance, and the larger the L value, the higher the brilliance. The larger the b value, the higher the degree of yellowing effect.

(3) Titanium content of catalyst

The titanium content of a catalyst compound was determined by using a fluorescent X-ray measurement apparatus (model: 3270 made by RIGAKU K. K.)

(4) Melting heat stability

Polyester pellets were placed in a glass tube having an outside diameter of 10 mm, an inside diameter of 8 mm and a length of 250 mm and immersed in a bath, in a nitrogen gas atmosphere, at 290° C. for 15 minutes to melt it. A difference in intrinsic viscosity of the polyester pellets between before and after the heat-treatment as mentioned above was determined. From the intrinsic viscosity differences the number (equivalent) of the breakages of the backbone chains of the polyester molecules per 1,000 kg of the polyester polymer was calculated in accordance with the following equation:

$$\text{Breakage number of backbone chains (eq./1,000 kg)} = \left\{ \left[ \frac{IV_1}{3.07 \times 10^{-4}} \right]^{-1.30} - \left[ \frac{IV_0}{3.07 \times 10^{-4}} \right]^{-1.30} \right\} \times 10^{-6}$$

in which equation, $IV_0$ represents an intrinsic viscosity of the polyester before the heat treatment and $IV_1$ represents an intrinsic viscosity of the polyester after the heat treatment.

(5) Layer of foreign matter adhered around a melt-extruding orifice.

A polyester was pelletized and melted at 290° C., and the polyester melt was extruded through 12 orifices each having a hole diameter of 0.15 mm, at a taking-up speed of 600 m/min, for 2 days.

The height of a layer of foreign matter adhered to the periphery of the melt-extruding orifice was measured.

The higher the adhered foreign matter layer, the lower the resistance of the extruded filamentary streams of the polyester melt to bending, and the lower the shaping property of the polyester. Namely, the height of the adhered foreign matter layer is a parameter of the shaping property of the polyester.

(6) The number of foreign particles

A sample of a polymer in an amount of 100 mg was dissolved in 20 ml of hexafluoroisopropanol and the resultant solution was filtered through a polytetrafluoroethylene membrane filter having an opening size of 3 μm and a diameter of 2.5 cm (trademark: T300A, made by ADVANTEC K. K.) at a temperature of 25° C. under a reduced pressure of 2.6 kPa. The number of foreign particles collected on the filter was counted by using an optical microscope, and the content of the foreign particles per g of the polymer was calculated.

Example 1

Preparation of Catalyst (A)

Ethyleneglycol in an amount of 2.5 parts by weight was dissolved in 0.8 part by weight, and then into the resultant solution, titanium tetrabutoxide in an amount of 0.7 part by weight (corresponding to 0.5 molar % based on the molar amount of trimellitic anhydride) was added dropwise. Then the resultant reaction system was maintained at a temperature of 80° C. for 60 minutes to react titanium tetrabutoxide with trimellitic anhydride and to age the reaction product. Thereafter, the reaction system was cooled to room temperature, and was mixed with 15 parts by weight of acetone and the resultant precipitation was collected by filtration and dried at a temperature of 100° C. for 2 hours.

The resultant reaction product (titanium compound (2)) had a titanium content of 11.5% by weight.

Then, 3.6 parts by weight of phenylphosphonic acid were dissolved in 131 parts by weight of ethyleneglycol by heating at a temperature of 120° C. for 10 minutes. The resultant ethyleneglycol solution in an amount of 134.5 parts by weight was further added with 40 parts by weight of ethyleneglycol, and in the resultant solution, 5.0 parts by weight of the above-mentioned titanium compound (2) were dissolved. The resultant reaction system was agitated at a temperature of 120° C. for 60 minutes to produce a reaction product of the titanium compound (2) with phenylphosphonic acid. A white-colored slurry of a catalyst (A) containing the reaction product was obtained. The slurry of the catalyst (A) had a titanium content of 0.3% by weight.

Preparation of a Polyester

Terephthalic acid in an amount of 166 parts by weight and ethyleneglycol in an amount of 75 parts by weight were subjected to an esterification reaction with each other at a temperature of 240° C., the resultant reaction product was placed in a polymerization flask equipped with a refining distillation column, and was mixed with the slurry of catalyst (A) as a polymerization catalyst, in an amount of 0.95 parts by weight (corresponding to $20 \times 10^{-3}$ molar % in terms of titanium atoms based on the molar amount of terephthalic acid) and with a color tone-regulating agent consisting of TERAZOLE BLUE in an amount of 0.0002 part by weight. The resultant reaction system was heated to a temperature of 285° C. under the ambient atmosphere pressure for 30 minutes; further heated at the above-mentioned temperature under a reduced pressure of 4.0 kPa (30 mmHg) for 15 minutes; and still further heated at the above-mentioned temperature for 110 minutes while the reaction pressure was gradually reduced and the reaction system was agitated, to complete the reaction. When the reaction was completed, the inside temperature of the flask was 285° C. and the final reaction pressure was 49.3 Pa (0.37 mmHg). The resultant polyester had an intrinsic viscosity of 0.640.

The test results are shown in Table 1.

Examples 2 to 5 and Comparative Examples 1 to 4

In each of Example 2 to 5 and Comparative Examples 1 to 4, a catalyst was prepared by the same procedures as in Example 1 and a polyester was prepared by the same procedures as in Example 1, except that the P/Ti molar ratio of the catalyst, and the amount of the catalyst used in the polyester production were changed to those as shown in Table 1. The test results are shown in Table 1.

Example 6

Preparation of Catalyst (B)

A mixture of 153 parts by weight of ethyleneglycol with 3.2 parts by weight of phenylphosphonic acid was heated at 120° C. for 10 minutes to provide a solution. Into 134.6 parts by weight of the ethyleneglycol solution, 3.4 parts by weight of titanium tetrabutoxide were added dropwise, and the resultant reaction system was agitated at a temperature of 120° C. for 60 minutes. A white-colored slurry containing a titanium compound (1) was obtained as a catalyst (B). The slurry had a titanium content of 0.3% by weight.

Preparation of a polyester

A polyester was prepared by the same procedures as in Example 1, except that the catalyst (B) produced by the above-mentioned procedures was employed as the polymerization catalyst. The test results are shown in Table 1.

Example 7

Preparation of a Polyester

A reaction vessel equipped with a refining distillation column was charged with 194 parts by weight of dimethyl terephthalate, 124 parts by weight of ethyleneglycol and 0.12 part by weight of calcium acetate; the charged mixture was subjected to an interesterification reaction at a temperature of 220° C.; after the resultant methyl alcohol in a theoretical quantity was removed by evaporation, the reaction mixture was added with 0.09 part by weight of phosphoric acid, to complete a first stage of reaction. Then the above-mentioned reaction mixture was placed in a polymerization flask equipped with a refining distillation column, and mixed with a polymerization catalyst consisting of the catalyst (A) slurry prepared by the same procedures as in Example 1 in an amount of 3.2 parts by weight (corresponding to a content of titanium compound (2) in terms of molar amount of titanium atoms of $20-10^{-3}\%$, based on the molar amount of dimethyl terephthalate) and a color tone-regulating agent consisting of TERAZOLE BLUE in an amount of 0.0002 part by weight. The resultant reaction system was heated to a temperature of 285° C. under the ambient atmospheric pressure for 30 minutes and further heated at the above-mentioned temperature under a reduced pressure of 4.0 kPa (30 mmHg) for 15 minutes to proceed the reaction; and after the inside pressure of the reaction system was gradually reduced, and the reaction system was still further heated at the above-mentioned temperature for 110 minutes while agitating the reaction system, to complete the reaction. In the flask, the final inside temperature was 285° C. and the final inside pressure was 49.3 Pa (0.37 mmHg).

The resultant polyester had an intrinsic viscosity of 0.640. The test results of the polyester are shown in Table 1.

Comparative Example 5

A polyester was prepared by the same procedures as in Example 7, except that, as a polymerization catalyst, titanium tetrabutoxide was employed, and the catalyst content and the amount of the catalyst slurry was controlled so that the amount of this catalyst in terms of molar amount of titanium atoms became $20-10^{-3}\%$ based on the molar amount of dimethyl terephthalate. The test results are shown in Table 1.

Example 8

Preparation of a Polyester

A polyester was prepared by the same procedures as in Example 7 except that, as a polymerization catalyst, the same catalyst (B) slurry as in Example 6 was employed.

The test results are shown in Table 1.

Comparative Example 6

Preparation of a catalyst (C)

Trimellitic anhydride was dissolved in an amount of 0.80 part by weight in ethyl alcohol. Into the resultant solution, 0.64 part by weight of titanium tetrabutoxide was added dropwise, and the resultant reaction system was held in the air atmosphere under the ambient atmospheric pressure at a temperature of 80° C. for 60 minutes to react titanium tetrabutoxide with trimellitic anhydride and to age the reaction product. After the reaction and the aging, the reaction system was cooled to room temperature and mixed with 15 parts by weight of acetone, and the resultant precipitation was collected by filtration. The resultant catalyst (C) had a titanium content of 12% by weight.

Preparation of a Polyester

A polyester was prepared by the same procedures as in Example 7, except that, as a polymerization catalyst, the above-mentioned catalyst (C) was employed and the catalyst concentration and the amount of the catalyst (C) slurry were controlled so that the amount of the catalyst (C) in terms of molar amount of titanium atoms become $20-10^{-3}\%$ based on the molar amount of dimethyl terephthalate.

The test results are shown in Table 1.

Comparative Example 7
Preparation of a Catalyst (D)

A catalyst (D) was prepared by the same procedures as those for the catalyst (A) disclosed in Example 1, except that 3.6 parts by weight of phenylphosphonic acid were replaced by 3.6 parts by weight of phenyl phosphite. A white-colored slurry of the catalyst (D) was obtained. The slurry had a titanium content of 0.3% by weight.

Preparation of a Polyester

A polyester was prepared by the same procedures as in Example 7, except that as a polymerization catalyst, the catalyst (D) produced by the above-mentioned procedures was employed in an amount of 3.2 parts by weight (corresponding to a molar amount of titanium atoms of $20\text{--}10^{-3}\%$ based on the molar amount of dimethyl terephthalate). The test results are shown in Table 1.

Comparative Example 8

A polyester was prepared by the same procedures as in Example 7, except that as a polymerization catalyst, diantimony trioxide was employed, and the content of the catalyst in the catalyst slurry and the amount of the catalyst slurry were established so that the molar amount of antimony atoms contained in the catalyst slurry was adjusted to $27\text{--}10^{-3}\%$ based on the molar amount of dimethyl terephthalate.

The test results are shown in Table 1.

temperature of 80° C. for 60 minutes to react titanium tetrabutoxide with trimellitic anhydride and to age the reaction product. Thereafter, the reaction system was cooled to room temperature, and was mixed with 15 parts by weight of acetone, the resultant precipitation was collected by filtration through a No. 5 filter paper and dried at a temperature of 100° C. for 2 hours. The resultant reaction product (titanium compound (2)) had a titanium content of 11.5% by weight.

Then, 5.6 parts by weight of 3,5-dicarboxyphenylphosphonic acid were mixed into 129 parts by weight of ethyleneglycol and dissolved by heating at a temperature of 120° C. for 10 minutes. The resultant ethyleneglycol solution in an amount of 134.5 parts by weight was further added with 40 parts by weight of ethyleneglycol, and in the resultant solution, 5.0 parts by weight of the above-mentioned titanium compound (2) were dissolved. The resultant reaction system was agitated at a temperature of 120° C. for 60 minutes. A slightly yellowish transparent solution of a catalyst (E) was obtained. The catalyst (E) solution had a titanium content of 0.3% by weight.

Preparation of a Polyester

Terephthalic acid in an amount of 166 parts by weight and ethyleneglycol in an amount of 75 parts by weight were subjected to an esterification reaction with each other at a temperature of 240° C., the resultant reaction product was placed in a polymerization flask equipped with a refining distillation column, and was mixed with the solution of

TABLE 1

| | | | | Properties of polyester | | | | Height of foreign matter layer |
|---|---|---|---|---|---|---|---|---|
| | Catalyst | | Intrinsic vis-cosity | Color tone | | Breakage number of backbone chains (eq./ | The number of foreign particles (particles/ | adhered around melt-spinning orifice |
| Example No. | P/Ti molar ratio | Amount of catalyst ($x^{-3}$ %) | (dl/g) | L | b | 1,000 kg) | g) | (μm) |
| Example 1 | 2.0 | 20 | 0.640 | 86.0 | 1.7 | 3.0 | 320 | 5 |
| 2 | 1.0 | 20 | 0.640 | 85.6 | 2.2 | 3.4 | 290 | 7 |
| 3 | 3.0 | 20 | 0.641 | 86.0 | 2.5 | 2.7 | 340 | 6 |
| 4 | 2.0 | 10 | 0.639 | 85.4 | 2.5 | 2.3 | 280 | 6 |
| 5 | 2.0 | 30 | 0.639 | 85.2 | 3.2 | 3.6 | 360 | 7 |
| 6 | 2.0 | 20 | 0.640 | 85.0 | 4.0 | 3.0 | 330 | 8 |
| 7 | 2.0 | 20 | 0.640 | 85.2 | 4.2 | 3.8 | 380 | 9 |
| 8 | 2.0 | 20 | 0.640 | 85.3 | 4.4 | 4.2 | 400 | 9 |
| Comparative Example 1 | 0.5 | 20 | 0.640 | 85.4 | 7.4 | 5.7 | 420 | 9 |
| 2 | 3.5 | 20 | | Reaction was not carried out. | | | | |
| 3 | 2.0 | 5 | | Reaction was not carried out. | | | | |
| 4 | 2.0 | 45 | 0.640 | 84.1 | 7.2 | 5.0 | 520 | 9 |
| 5 | — | 20 | 0.640 | 82.1 | 9.3 | 5.9 | 720 | 5 |
| 6 | — | 20 | 0.640 | 84.2 | 5.2 | 5.3 | 590 | 8 |
| 7 | 2.0 | 20 | 0.640 | 84.1 | 5.8 | 3.6 | 530 | 9 |
| 8 | — (Sb$_2$O$_3$) | 25 | 0.639 | 84.5 | 0.3 | 3.5 | 400 | 49 |

Example 9
Preparation of Catalyst (E)

Ethyleneglycol in an amount of 2.5 parts by weight was dissolved in 0.8 part by weight of trimellitic anhyride; into the resultant solution, titanium tetrabutoxide in an amount of 0.7 part by weight (corresponding to 0.5 molar % based on the molar amount of trimellitic anhydride) was added dropwise, the resultant reaction system was maintained at a catalyst (E) as a polymerization catalyst, in an amount of 0.95 parts by weight (corresponding to $20\text{--}10^{-3}$ molar % in terms of a molar amount of titanium atoms based on the molar amount of terephthalic acid) and with a color tone-regulating agent consisting of TERAZOLE BLUE in an amount of 0.0002 part by weight. The resultant reaction system was heated to a temperature of 285° C. under the ambient atmospheric pressure for 30 minutes; further heated at the above-mentioned temperature under a reduced pressure of 4.0 kPa (30 mmHg) for 15 minutes; and still further heated at the above-mentioned temperature for 110 minutes while the reaction pressure was gradually reduced and the reaction system was agitated, to complete the reaction. When the reaction was completed, the inside temperature of the flask was 285° C. and the final reaction pressure was 49.3 Pa (0.37 mmHg). The resultant polyethylene terephthalate had an intrinsic viscosity of 0.640.

The test results are shown in Table 2.

Examples 10 to 13 and Comparative Examples 9 to 12

In each of Examples 10 to 13 and Comparative Examples 9 to 12, a catalyst (A) was prepared by the same procedures as for the catalyst (E) in Example 9 and a polyester was prepared by the same procedures as in Example 9, except that the P/Ti molar ratio of the catalyst, and the amount of the catalyst used in the polyester production were changed to those as shown in Table 2. The test results are shown in Table 2.

Example 14
Preparation of catalyst (F)

A mixture of 151.2 parts by weight of ethyleneglycol with 5.0 parts by weight of 3,5-dicarboxyphenylphosphonic acid was heated at 120° C. for 10 minutes to provide a solution. Into 134.6 parts by weight of ethyleneglycol solution 3.4 parts by weight of titanium tetrabutoxide were added dropwise, and the resultant reaction system was agitated at a temperature of 120° C. for 60 minutes. A slight-yellowish transparent solution of a catalyst (F) was obtained. The catalyst (F) solution had a titanium content of 0.3% by weight.

Preparation of a Polyester

A polyester was prepared by the same procedures as in Example 9, except that the catalyst (F) produced by the above-mentioned procedures was employed as the polymerization catalyst. The test results are shown in Table 2.

Example 15
Preparation of a Polyester

A reaction vessel equipped with a refining distillation column was charged with 194 parts by weight of dimethyl terephthalate, 124 parts by weight of ethyleneglycol and 0.12 part by weight of calcium acetate; the charged mixture was subjected to an interesterification reaction at a temperature of 220° C.; after the resultant methyl alcohol in a theoretical quantity was removed by evaporation, the reaction mixture was added with 0.09 part by weight of phosphoric acid, to complete a first stage of reaction. Then the above-mentioned reaction mixture was placed in a polymerization flask equipped with a refining distillation column, and mixed with a polymerization catalyst consisting of the catalyst (E) solution in an amount of 3.2 parts by weight (corresponding to a molar amount of titanium atoms of $20-10^{-3}\%$ based on the molar amount of dimethyl terephthalate) and a color tone-regulating agent consisting of TERAZOLE BLUE in an amount of 0.0002 part by weight. The resultant reaction system was heated to a temperature of 285° C. under the ambient atmospheric pressure for 30 minutes and further heated at the above-mentioned temperature under a reduced pressure of 4.0 kPa (30 mmHg) for 15 minutes to proceed the reaction; and after the inside pressure of the reaction system was gradually reduced, and the reaction system was still further heated at the above-mentioned temperature for 110 minutes while agitating the reaction system, to complete the reaction. In the flask, the final inside temperature was 285° C. and the final inside pressure was 49.3 Pa (0.37 mmHg).

The resultant polyethylene terephthalate had an intrinsic viscosity of 0.640. The test results of the polyester are shown in Table 2.

Example 16
Preparation of a Polyester

A polyester was prepared by the same procedures as in Example 15, except that as a polymerization catalyst, the catalyst (E) solution was replaced by the catalyst (F) solution.

The test results are shown in Table 2.

TABLE 2

| | | Item | | | | | |
|---|---|---|---|---|---|---|---|
| | | | | Properties of polyester | | | Height of foreign matter layer |
| | | Catalyst | | Intrinsic | | Breakage number of backbone | The number of foreign | adhered around melt- |
| Example No. | | P/Ti molar ratio | Amount of catalyst $(x^{-3}\%)$ | viscosity (dl/g) | Color tone L / b | chains (eq./ 1,000 kg) | particles (particles/ g) | spinning orifice ($\mu$m) |
| Example | 9 | 2.0 | 20 | 0.640 | 86.0 / 1.5 | 2.9 | 300 | 5 |
| | 10 | 1.0 | 20 | 0.639 | 85.8 / 2.0 | 3.3 | 300 | 6 |
| | 11 | 3.0 | 20 | 0.639 | 86.2 / 2.2 | 2.6 | 330 | 8 |
| | 12 | 2.0 | 10 | 0.641 | 85.3 / 2.3 | 2.3 | 290 | 8 |
| | 13 | 2.0 | 30 | 0.640 | 85.2 / 3.0 | 3.6 | 360 | 9 |
| | 14 | 2.0 | 20 | 0.640 | 84.9 / 3.6 | 2.9 | 340 | 7 |
| | 15 | 2.0 | 20 | 0.640 | 85.2 / 4.0 | 3.6 | 390 | 9 |
| | 16 | 2.0 | 20 | 0.639 | 85.4 / 4.1 | 4.0 | 410 | 9 |
| Comparative Example | 9 | 0.5 | 20 | 0.640 | 85.2 / 7.7 | 5.6 | 420 | 10 |
| | 10 | 3.5 | 20 | Reaction was not effected. | | | | |
| | 11 | 2.0 | 5 | Reaction was not effected. | | | | |
| | 12 | 2.0 | 45 | 0.640 | 84.0 / 7.2 | 4.9 | 540 | 10 |

Example 17

Preparation of Catalyst (G)

Ethyleneglycol in an amount of 2.5 parts by weight was dissolved in 0.8 part by weight of trimellitic anhyride; into the resultant solution, titanium tetrabutoxide in an amount of 0.7 part by weight (corresponding to 0.5 molar % based on the molar amount of trimellitic anhydride) was added dropwise, the resultant reaction system was maintained at a temperature of 80° C. for 60 minutes to react titanium tetrabutoxide with trimellitic anhydride and to age the reaction product. Thereafter, the reaction system was cooled to room temperature, and was mixed with 15 parts by weight of acetone, the resultant precipitation was collected by filtration through a No. 5 filter paper and dried at a temperature of 100° C. for 2 hours. The resultant reaction product (titanium compound (2)) had a titanium content of 11.5% by weight.

Then, 5.2 parts by weight of diphenylphosphinic acid were dissolved in 136 parts by weight of ethyleneglycol by heating at a temperature of 120° C. for 10 minutes. The resultant ethyleneglycol solution in an amount of 141.2 parts by weight was further added with 40 parts by weight of ethyleneglycol and, in the resultant solution, 5.0 parts by weight of the above-mentioned titanium compound (2) were dissolved. The resultant reaction system was agitated at a temperature of 120° C. for 60 minutes to produce a reaction product of the titanium compound (2) with diphenylphosphinic acid. A slightly yellowish transparent solution of a catalyst (G) was obtained. The slurry of the catalyst (G) solution had a titanium content of 0.3% by weight.

Preparation of a Polyester

Terephthalic acid in an amount of 166 parts by weight and ethyleneglycol in an amount of 75 parts by weight were subjected to an esterification reaction with each other at a temperature of 240° C., the resultant esterification product was placed in a polymerization flask equipped with a refining distillation column, and was mixed with the catalyst (G) solution in an amount of 0.95 parts by weight (corresponding to $20\times10^{-3}$ molar % of a molar amount of titanium atoms based on the molar amount of terephthalic acid) and with a color tone-regulating agent consisting of TERAZOLE BLUE in an amount of 0.0002 part by weight. The resultant reaction system was heated to a temperature of 285° C. under the ambient atmospheric pressure for 30 minutes; further heated at the above-mentioned temperature under a reduced pressure of 4.0 kPa (30 mmHg) for 15 minutes; and still further heated at the above-mentioned temperature for 110 minutes while the reaction pressure was gradually reduced and the reaction system was agitated, to complete the reaction. When the reaction was completed, the final inside temperature of the flask was 285° C. and the final reaction pressure was 49.3 Pa (0.37 mmHg). The resultant polyethylene terephthalate had an intrinsic viscosity of 0.640.

The test results are shown in Table 3.

Examples 18 to 21 and Comparative Examples 13 to 16

In each of Example 18 to 21 and Comparative Examples 13 to 16, a catalyst was prepared by the same procedures as for the catalyst (G) in Example 17 and a polyester was prepared by the same procedures as in Example 17, except that the P/Ti molar ratio of the catalyst, and the amount of the catalyst used in the polyester production were changed to those as shown in Table 3. The test results are shown in Table 3.

Example 22

Preparation of Catalyst (H)

A mixture of 147.3 parts by weight of ethyleneglycol with 4.4 parts by weight of diphenylphosphinic acid was heated at 120° C. for 10 minutes to provide a solution. Into 151.7 parts by weight of the ethyleneglycol solution, 3.4 parts by weight of titanium tetrabutoxide were added dropwise, and the resultant reaction system was heated and agitated at a temperature of 120° C. for 60 minutes. A slightly yellowish transparent solution containing a catalyst (H) was obtained. The catalyst (H) solution had a titanium content of 0.3% by weight.

Preparation of a Polyester

A polyester was prepared by the same procedures as in Example 17, except that the catalyst (H) produced by the above-mentioned procedures was employed as the polymerization catalyst. The test results are shown in Table 3.

Example 23

Preparation of a Polyester

A reaction vessel equipped with a refining distillation column was charged with 194 parts by weight of dimethyl terephthalate, 124 parts by weight of ethyleneglycol and 0.12 part by weight of calcium acetate; the charged mixture was subjected to an interesterification reaction at a temperature of 220° C.; after the resultant methyl alcohol in a theoretical quantity was removed by evaporation, the reaction mixture was added with 0.09 part by weight of phosphoric acid, to complete a first stage of reaction. Then the above-mentioned reaction mixture was placed in a polymerization flask equipped with a refining distillation column, and mixed with a polymerization catalyst consisting of the catalyst (G) solution in an amount of 3.2 parts by weight (corresponding to a molar amount of titanium atoms of $20\times10^{-3}$%, based on the molar amount of dimethyl terephthalate) and a color tone-regulating agent consisting of TERAZOLE BLUE in an amount of 0.0002 part by weight. The resultant reaction system was heated to a temperature of 285° C. under the ambient atmospheric pressure for 30 minutes and further heated at the above-mentioned temperature under a reduced pressure of 4.0 kPa (30 mmHg) for 15 minutes to proceed the reaction; and after the inside pressure of the reaction system was gradually reduced, and the reaction system was still further heated at the above-mentioned temperature for 110 minutes while the reaction system is agitated to complete the reaction. In the flask, the final inside temperature was 285° C. and the final inside pressure was 49.3 Pa (0.37 mmHg).

The resultant polyethylene terephthalate had an intrinsic viscosity of 0.640. The test results of the polyester are shown in Table 3.

Example 24

Preparation of a Polyester

A polyester was prepared by the same procedures as in Example 23, except that as a polymerization catalyst, the catalyst (H) solution was employed.

The test results are shown in Table 3.

TABLE 3

| Example No. | | Catalyst P/Ti molar ratio | Catalyst Amount of catalyst (x⁻³ %) | Properties of polyester Intrinsic viscosity (dl/g) | Color tone L | Color tone b | Breakage number of backbone chains (eq./1,000 kg) | The number of foreign particles (particles/g) | Height of foreign matter layer adhered around melt-spinning orifice (μm) |
|---|---|---|---|---|---|---|---|---|---|
| Example | 17 | 2.0 | 20 | 0.640 | 85.5 | 1.8 | 3.1 | 320 | 4 |
| | 18 | 1.0 | 20 | 0.640 | 85.2 | 2.2 | 3.4 | 320 | 5 |
| | 19 | 3.0 | 20 | 0.640 | 86.2 | 2.2 | 2.8 | 350 | 7 |
| | 20 | 2.0 | 10 | 0.641 | 84.4 | 2.2 | 2.5 | 300 | 7 |
| | 21 | 2.0 | 30 | 0.640 | 85.2 | 2.9 | 3.7 | 380 | 8 |
| | 22 | 2.0 | 20 | 0.639 | 84.9 | 3.8 | 3.0 | 350 | 8 |
| | 23 | 2.0 | 20 | 0.640 | 84.4 | 4.1 | 3.8 | 400 | 9 |
| | 24 | 2.0 | 20 | 0.640 | 84.1 | 4.0 | 4.0 | 400 | 10 |
| Comparative Example | 13 | 0.5 | 20 | 0.640 | 84.2 | 7.9 | 5.3 | 410 | 10 |
| | 14 | 3.5 | 20 | Reaction was not effected. | | | | | |
| | 15 | 2.0 | 5 | Reaction was not effected. | | | | | |
| | 16 | 2.0 | 45 | 0.640 | 83.0 | 7.4 | 5.1 | 570 | 11 |

Example 25

Preparation of Catalyst (I)

Trimethyleneglycol in an amount of 2.5 parts by weight was dissolved in 0.8 part by weight of trimellitic anhyride and, into the resultant solution, titanium tetrabutoxide in an amount of 0.7 part by weight (corresponding to 0.5 molar % based on the molar amount of trimellitic anhydride) was added dropwise, the resultant reaction system was maintained at a temperature of 80° C. for 60 minutes to react titanium tetrabutoxide with trimellitic anhydride and to age the reaction product. Thereafter, the reaction system was cooled to room temperature, and was mixed with 15 parts by weight of acetone, the resultant precipitation was collected by filtration through a No. 5 filter paper and dried at a temperature of 100° C. for 2 hours. The resultant reaction product (titanium compound (2)) had a titanium content of 11.5% by weight.

Then, 3.6 parts by weight of phenylphosphinic acid were dissolved in 131 parts by weight of trimethyleneglycol by heating at a temperature of 120° C. for 10 minutes. The resultant trimethyleneglycol solution in an amount of 134.5 parts by weight was further added with 40 parts by weight of trimethyleneglycol and, in the resultant solution, 5.0 parts by weight of the above-mentioned titanium compound (2) were dissolved. The resultant reaction system was heated and agitated at a temperature of 120° C. for 60 minutes to produce a reaction product of the titanium compound (2) with phenylphosphonic acid. A white-colored slurry of a reaction product, namely a catalyst (I) was obtained. The slurry of the catalyst (I) had a titanium content of 0.3% by weight.

Preparation of a Polyester

Terephthalic acid in an amount of 166 parts by weight and trimethyleneglycol in an amount of 92 parts by weight were subjected to an esterification reaction with each other at a temperature of 240° C., the resultant reaction product was placed in a polymerization flask equipped with a refining distillation column, and was mixed with the slurry of catalyst (I) used, as a polymerization catalyst, in an amount of 0.95 parts by weight (corresponding to a molar amount of titanium atoms of 20×10⁻³% based on the molar amount of terephthalic acid) and with a color tone-regulating agent consisting of TERAZOLE BLUE in an amount of 0.0002 part by weight. The resultant reaction system was heated to a temperature of 250° C. under the ambient atmospheric pressure for 30 minutes; further heated at the above-mentioned temperature under a reduced pressure of 4.0 kPa for 15 minutes; and still further heated at the above-mentioned temperature for 110 minutes while the reaction pressure was gradually reduced and the reaction system was agitated, to complete the reaction. When the reaction was completed, the inside temperature of the flask was 250° C. and the final reaction pressure was 49.3 Pa. The resultant polytrimethylene terephthalate had an intrinsic viscosity of 0.680.

The test results are shown in Table 4.

Examples 26 to 30 and Comparative Examples 17 to 20

In each of Examples 26 to 30 and Comparative Examples 17 to 20, a polyester was prepared by the same procedures as in Example 25, except that the P/Ti molar ratio of the catalyst (I), and the amount of the catalyst used in the polyester production were changed to those as shown in Table 4. The test results are shown in Table 4.

Example 31

Preparation of Catalyst (J)

A mixture of 153 parts by weight of trimethyleneglycol with 5.0 parts by weight of phenylphosphinic acid was heated at 120° C. for 10 minutes to provide a solution. Into 158.0 parts by weight of the ethyleneglycol solution, 3.4 parts by weight of titanium tetrabutoxide were added dropwise, and the resultant reaction system was agitated and heated at a temperature of 120° C. for 60 minutes to react phenylphosphonic acid with titanium tetrabutoxide. A white-colored slurry containing the reaction product, namely a catalyst J was obtained. The catalyst (J) slurry had a titanium content of 0.3% by weight.

Preparation of a Polyester

A polyester was prepared by the same procedures as in Example 25, except that the catalyst (J) was employed as the polymerization catalyst. The test results are shown in Table 4.

Example 32
Preparation of a Polyester

A reaction vessel equipped with a refining distillation column was charged with 194 parts by weight of dimethyl terephthalate, 152 parts by weight of trimethyleneglycol and 0.12 part by weight of calcium acetate; the charged mixture was subjected to an interesterification reaction at a temperature of 220° C.; after the resultant methyl alcohol in a theoretical quantity was removed by evaporation, the reaction mixture was added with 0.09 part by weight of phosphoric acid, to complete a first stage of reaction. Then the above-mentioned reaction mixture was placed in a polymerization flask equipped with a refining distillation column, and mixed with a polymerization catalyst consisting of the catalyst (I) slurry in an amount of 3.2 parts by weight (corresponding to a molar amount of titanium atoms of $20 \times 10^{-3}\%$ based on the molar amount of dimethyl terephthalate) and a color tone-regulating agent consisting of TERAZOLE BLUE in an amount of 0.0002 part by weight. The resultant reaction system was heated to a temperature of 250° C. under the ambient atmospheric pressure for 30 minutes and further heated at the above-mentioned temperature under a reduced pressure of 4.0 kPa for 15 minutes to proceed the reaction; and after the inside pressure of the reaction system was gradually reduced, and the reaction system was still further heated at the above-mentioned temperature for 110 minutes while agitating the reaction system, to complete the reaction. In the flask, the final inside temperature was 250° C. and the final inside pressure was 49.3 Pa (0.37 mmHg).

The resultant polytrimethylene terephthalate had an intrinsic viscosity of 0.678. The test results of the polyester are shown in Table 4.

Example 33
Preparation of a Polyester

A polyester was prepared by the same procedures as in Example 33, except that the catalyst (J) was employed as the polymerization catalyst. The results are shown in Table 4.

Comparative Example 21

A polyester was prepared by the same procedures as in Example 32, except that, as a polymerization catalyst, titanium tetrabutoxide was employed, and the catalyst content and the amount of the catalyst slurry was controlled so that the amount of this catalyst in terms of molar amount of titanium atoms is $20 \times 10^{-3}\%$ based on the molar amount of dimethyl terephthalate. The test results are shown in Table 4.

Example 34
Preparation of Catalyst (K)

Tetramethyleneglycol in an amount of 2.5 parts by weight was dissolved in 0.8 part by weight of trimellitic anhydride and, into the resultant solution, titanium tetrabutoxide in an amount of 0.7 part by weight (corresponding to 0.5 molar % based on the molar amount of trimellitic anhydride) was added dropwise and the resultant reaction system was maintained at a temperature of 80° C. for 60 minutes to react titanium tetrabutoxide with trimellitic anhydride and to age the reaction product. Thereafter, the reaction system was cooled to room temperature, and was mixed with 15 parts by weight of acetone, the resultant precipitation was collected by filtration through a No. 5 filter paper and dried at a temperature of 100° C. for 2 hours. The resultant reaction product (titanium compound (2)) had a titanium content of 11.5% by weight.

Then, 3.6 parts by weight of phenylphosphonic acid were dissolved in 131 parts by weight of tetramethyleneglycol by heating at a temperature of 120° C. for 10 minutes. The resultant tetramethyleneglycol solution in an amount of 134.5 parts by weight was further added with 40 parts by weight of tetramethyleneglycol, and in the resultant solution, 5.0 parts by weight of the above-mentioned titanium compound (2) were dissolved. The resultant reaction system was agitated and heated at a temperature of 120° C. for 60 minutes. A white-colored slurry containing a catalyst (K) was obtained. The slurry of the catalyst (K) had a titanium content of 0.3% by weight.

Preparation of a Polyester

Terephthalic acid in an amount of 166 parts by weight and tetramethyleneglycol in an amount of 109 parts by weight were subjected to an esterification reaction with each other at a temperature of 240° C., the resultant reaction product was placed in a polymerization flask equipped with a refining distillation column, and was mixed with the slurry of catalyst (K) as a polymerization catalyst, in an amount of 0.95 parts by weight (corresponding to a molar amount of titanium atoms of $20 \times 10^{-3}\%$ based on the molar amount of terephthalic acid) and with a color tone-regulating agent consisting of TERAZOLE BLUE in an amount of 0.0002 part by weight. The resultant reaction system was heated to a temperature of 250° C. under the ambient atmospheric pressure for 30 minutes; further heated at the above-mentioned temperature under a reduced pressure of 4.0 kPa for 15 minutes; and still further heated at the above-mentioned temperature for 110 minutes while the reaction pressure was gradually reduced and the reaction system was agitated, to complete the reaction. When the reaction was completed, the inside temperature of the flask was 250° C. and the final reaction pressure was 49.3 Pa. The resultant polytetramethylene terephthalate had an intrinsic viscosity of 0.700.

The test results are shown in Table 4.

Comparative Example 22

A polyester was prepared by the same procedures as in Example 25, except that, as a polymerization catalyst, the catalyst (C) mentioned in Comparative Example 6 was employed above, and the catalyst content and the amount of the catalyst slurry was controlled so that the amount of this catalyst in terms of molar amount of titanium atoms was $20 \times 10^{-3}\%$ based on the molar amount of terephthalic acid. The test results are shown in Table 4.

Comparative Example 23
Preparation of a Catalyst (L)

A catalyst was prepared by the same procedures as in Example 25, except that 3.6 parts by weight of phenyl phosphite were employed in place of 3.6 parts by weight of phenylphosphonic acid. A white colored slurry containing a catalyst (L) was obtained. The catalyst (L) slurry has a titanium content of 0.3% by weight.

Preparation of a Polyester

A polyester was prepared by the same procedures as in Example 25, except that as a polymerization catalyst, the catalyst (L) slurry was employed in an amount of 3.2 parts by weight corresponding a molar amount of titanium atoms of $20 \times 10^{-3}\%$ based on the molar amount of terephthalic acid. The test results are shown in Table 4.

Comparative Example 24

A polyester was prepared by the same procedures as in Example 32, except that, as a polymerization catalyst, diantimony trioxide was employed alone, and the amount of the catalyst was controlled to a molar amount in terms of titanium atoms of $20 \times 10^{-3}\%$ based on the molar amount of terepthalic acid. The test results are shown in Table 4.

TABLE 4

| Example No. | Catalyst P/Ti molar ratio | Catalyst Amount of catalyst (x⁻³ %) | Intrinsic vis-cosity (dl/g) | Color tone L | Color tone b | Breakage number of backbone chains (eq./1,000 kg) | The number of foreign particles (particles/g) | Height of foreign matter layer adhered around melt-spinning orifice (μm) |
|---|---|---|---|---|---|---|---|---|
| Example 25 | 2.0 | 20 | 0.680 | 88.0 | 1.2 | 2.7 | 290 | 7 |
| 26 | 1.0 | 20 | 0.679 | 87.2 | 1.5 | 3.2 | 310 | 8 |
| 27 | 3.0 | 20 | 0.681 | 88.2 | 0.9 | 2.4 | 340 | 5 |
| 28 | 2.0 | 10 | 0.680 | 87.3 | 1.8 | 2.5 | 280 | 8 |
| 29 | 2.0 | 30 | 0.680 | 87.2 | 2.0 | 3.7 | 370 | 9 |
| 30 | 2.0 | 20 | 0.679 | 86.5 | 3.0 | 2.9 | 350 | 7 |
| 31 | 2.0 | 20 | 0.678 | 87.0 | 3.2 | 3.5 | 400 | 8 |
| 32 | 2.0 | 20 | 0.680 | 87.1 | 3.8 | 3.8 | 400 | 7 |
| 33 | 2.0 | 20 | 0.700 | 89.0 | 1.1 | 2.9 | 290 | 6 |
| Comparative 17 | 0.5 | 20 | 0.680 | 85.1 | 7.9 | 5.6 | 450 | 12 |
| Example 18 | 3.5 | 20 | Reaction was not effected. | | | | | |
| 19 | 2.0 | 5 | Reaction was not effected. | | | | | |
| 20 | 2.0 | 45 | 0.679 | 83.8 | 7.5 | 4.9 | 560 | 15 |
| 21 | — | 20 | 0.680 | 82.3 | 9.9 | 5.9 | 730 | 7 |
| 22 | — | 20 | 0.681 | 84.0 | 6.2 | 5.3 | 580 | 9 |
| 23 | 2.0 | 20 | 0.680 | 84.2 | 6.8 | 3.6 | 550 | 10 |
| 24 | (Sb₂O₃) | 25 | 0.679 | 84.4 | 0.5 | 3.5 | 380 | 52 |

INDUSTRIAL APPLICABILITY

By using the catalyst of the present invention and the process for producing a polyester using the catalyst, a polyester having an excellent color tone, a small content of foreign matter and an excellent melting heat stability can be produced. Further, the polyester obtained in accordance with the process of the present invention is advantageous in that even when the melt-spinning procedure for the polyester is continuously carried out through a melt-spinning orifice over a long period, a foreign matter is adhered in a very small amount to around the melt spinning orifice, and the polyester exhibits an excellent forming property.

What is claimed is:

1. A catalyst for producing a polyester comprising a reaction product of (A) a titanium compound component comprising at least one member selected from the group consisting of: titanium compounds (1) represented by the general formula (I):

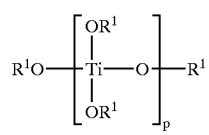

in which formula (I), $R^1$ represents an alkyl group having 2 to 10 carbon atoms and p represents an integer of 1 to 3, and titanium compounds (2) produced by reacting the titanium compounds (1) of the formula (I) with aromatic polycarboxylic acids represented by the general formula (II):

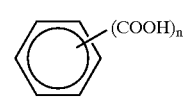

in which formula (II), n represents an integer of 2 to 4, or anhydrides of the aromatic polycarboxylic acids of the formula (II), with (B) a phosphorus compound component comprising at least one member selected from the phosphonic acid compounds (3) of the general formula (III):

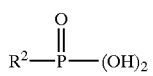

in which formula (II), $R^2$ represents an unsubstituted or substituted aryl group having 6 to 20 carbon atoms or alkyl group having 1 to 20 carbon atoms, a ratio of the amount of the titanium compound component (A) in terms of a molar amount of titanium atoms ($m_{Ti}$) to the amount of the phosphorus compound component (B) in terms of a molar amount of phosphorus atoms ($m_p$) being in the range of from 1:1 to 1:4.

2. The catalyst for producing a polyester as claimed in claim 1, wherein the titanium compound (1) of the formula (I) is selected from the group consisting of titanium tetraalkoxides, octaalkyl trititanates and hexaalkyl dititanates.

3. The catalyst for producing a polyester as claimed in claim 1, wherein the aromatic polycarboxylic acids of the formula (II) or anhydrides thereof are selected from the group consisting of phthalic acid, trimellitic acid, hemimellitic acid and pyromellitic acid or nhydrides of the above-mentioned acids.

4. The catalyst for producing a polyester as claimed in claim 1, wherein the titanium compounds (2) are reaction products of the titanium compounds (1) of the formula (I) with the aromatic polycarboxylic acids of the formula (II) or the anhydrides thereof in a reaction molar ratio of 2:1 to 2:5.

5. The catalyst for producing a polyester as claimed in claim 1, wherein the phosphonic acid compounds (3) of the formula (III) are selected from the group consisting of: phenylphosphonic acid, methylphosphonic acid, ethylphosphonic acid, propylphosphonic acid, isopropylphosphonic acid, butylphosphonic acid, tolylphosphonic acid, xylylphosphonic acid, biphenylphosphonic acid, naphthylphosphonic acid, anthorylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicarboxyphenylphosphonic acid, 3,5-dicarboxyphenylphosphonic acid, 2,3,4-tricarboxyphenylphosphonic acid, 2,3,5-tricarboxyphenylphosphonic acid, 2,3,6-tricarboxyphenylphosphonic acid, 2,4,5-tricarboxyphenylphosphonic acid and 2,4,6-tricarboxyphenylphosphonic acid.

6. The catalyst for producing a polyester as claimed in claim 1; wherein the reaction product of the titanium compound component (A) with the phosphorus compound component (B) is one produced at a reaction temperature of 0 to 200° C.

7. A process for producing a polyester comprising a step of polymerizing a polymerization-starting material comprising at least one member selected from the group consisting of alkyleneglycol esters of aromatic difunctional carboxylic acids and oligomers thereof in the presence of a catalyst, wherein the catalyst comprises a reaction product of (A) a titanium compound component comprising at least one member selected from the group consisting of:
titanium compounds (1) represented by the general formula (I):

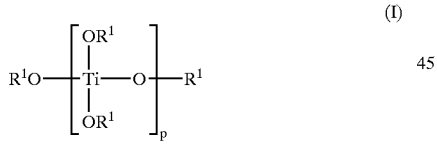

(I)

in which formula (I), $R^1$ represents an alkyl group having 2 to 10 carbon atoms and p represents an integer of 1 to 3, and titanium compounds (2) produced by reacting the titanium compounds (1) of the formula (I) with aromatic polycarboxylic acids represented by the general formula (II):

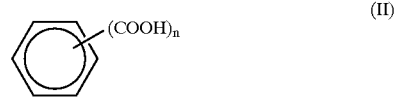

(II)

in which formula (II), n represents an integer of 2 to 4, or anhydrides of the aromatic polycarboxylic acids of the formula (II), with (B) a phosphorus compound component comprising at least one member selected from the phosphonic acid compounds (3) of the general formula (D):

(III)

in which formula (II), $R^2$ represents an unsubstituted or substituted aryl group having 6 to 20 carbon atoms or alkyl group having 1 to 20 carbon atoms, a ratio of the amount of the titanium compound component (A) in terms of a molar amount of titanium atoms ($m_{Ti}$) to the amount of the phosphorus compound component (B) in terms of a molar amount of phosphorus atoms ($m_p$) being in the range of from 1:1 to 1:4, and the amount of the catalyst in terms of molar amount in millimole of titanium atoms contained in the catalyst corresponding to 10 to 40% of the amount in millimole of the aromatic difunctional carboxylic acid contained in the polymerization-starting material.

8. The process for producing a polyester as claimed in claim 7, wherein the aromatic difunctional acid is selected from the group consisting of terephthalic acid, isophthalic acid, naphthalenedicarboxylic acid, biphenyldicarboxylic acid, diphenylsulfonedicarboxylic acid, diphenyletherdicarboxylic acid, diphenyletherdicarboxylic acid, diphenoxyethanedicarboxylic acid, and β-hydroethoxybenzoic acid.

9. The process for producing a polyester as claimed in claim 7, wherein the alkyleneglycols are selected from ethyleneglycol, trimethyleneglycol, tetramethyleneglycol, neopentylglycol and hexamethyleneglycol.

10. The process for producing a polyester as claimed in claim 7, wherein the polymerization reaction is carried out at a temperature of 230 to 320° C.

11. The polyester as claimed in any one of claims 8 to 10, which contains no cobalt compound and satisfies the requirement that:

(a) when the polyester is melted at a temperature of 290° C. under vacuum for 10 minutes, the melt is formed into a plate having a thickness of 3.0±1 mm on an aluminum plate, immediately after the forming, the polyester plate is rapidly cooled in ice water, and then is dried and subjected to a crystallization treatment at a temperature of 160° C. for one hour, then the crystallized polyester plate is placed on a plate having a standard whiteness for tuning a color difference meter, and the color tone of the polyester plate surface is measured by using the color difference meter, the L value of the polyester plate surface is 80.0 or more and the b value of the polyester plate surface is in the range of from −2.0 to 5.0.

12. The polyester as claimed in any one of claims 7 to 10, satisfying the requirement that:

(b) the content of solid foreign particles having an average particle size of 3 μm or more is limited to 500 particles/g or less.

13. The polyester as claimed in any one of claims 7 to 10, satisfying the requirement that:

(c) when heated in a nitrogen gas atmosphere at a temperature of 290° C. for 15 minutes, the number of breakage of backbone chains of the polyester molecules is 4.0 equivalents/1,000 kg or less.

* * * * *

UNITED STATES PATENT AND TRADEMARK OFFICE
CERTIFICATE OF CORRECTION

PATENT NO.    : 6,593,447 B1
DATED         : July 15, 2003
INVENTOR(S)   : Tomoyoshi Yamamoto It is certified that error appears in the above-identified patent and that said Letters Patent is hereby corrected as shown below:

Column 26,
Line 50, change "in which formula (II)" to -- in which formula (III) --.

Column 28,
Line 3, change "the general formula (D)" to -- the general formula (III) --;
Line 10, change "in which formula (II)" to -- in which formula (III) --.

Signed and Sealed this

Tenth Day of August, 2004

JON W. DUDAS
*Acting Director of the United States Patent and Trademark Office*